Oct. 13, 1970 — K. GLOOR ET AL — 3,533,152
METHOD FOR THE PRODUCTION OF A SEAMLESS TUBULAR WIRE FILLED WITH A POWDERY MATERIAL
Filed Nov. 20, 1967

INVENTORS
Karl Gloor,
Hans Baach,
Hans Dieter Jakubasch,
Rudolf Stein, and
Hans Dieter Erhard

BY

ATTORNEYS 3,533,152
METHOD FOR THE PRODUCTION OF A SEAMLESS TUBULAR WIRE FILLED WITH A POWDERY MATERIAL
Karl Gloor, Zollikon, and Hans Baach, Niederglatt, Switzerland, Hans Dieter Jacubasch, Eisenberg, Rudolf Stein, Neuleiningen, and Hans Dieter Erhard, Frankenthal, Germany, assignors to Elektrodenfabrik Derlikon Buhrle AG Zurich, Switzerland, a corporation of Switzerland
Filed Nov. 20, 1967, Ser. No. 684,158
Claims priority, application Switzerland, Nov. 23, 1966
16,767/66
Int. Cl. B22f 3/24
U.S. Cl. 29—420.5                    11 Claims

ABSTRACT OF THE DISCLOSURE

Method for the production of seamless tubular wire filled with a powdery material, particularly welding wire or the like, wherein a circumferentially continuous tubular material is filled with the powdery material to a predetermined density by initially winding the tubular material on a spool and then feeding the powdery material into one end of the tube while simultaneously jarring or shaking the spool with the tube wound thereon. After filling, the tube is initially drawn to further compress the powdery material therein while reducing the external diameter without significantly affecting the wall thickness. Further drawing, due to the internal compressive strength of the powdery material, reduces the outside diameter of the tube while proportionally reducing the wall thickness. This procedure permits the production of a finished tubular wire having any predetermined ratio between the wall cross-section and the filling material volume. By utilizing a circumferentially continuous, or seamless, tube, working of the finished product can be accomplished without rupturing the sheath or jacket. Additionally, the powdery filling material is protected from environmental moisture and, additionally, a wet surface treatment, such as an electrochemical deposition, can be utilized to provide the tubular wire with a surface coating. The tube can be pretreated by mechanical and chemical cleaning of the internal surface, stress annealing of the same and testing of the same for tightness. Further, the filled tubular wire can be stress annealed between drawing operations. Additionally, the unfilled tube can be initially drawn to reduce its external diameter without significantly modifying its wall thickness to provide a ratio of wall cross-section to interior volume similar to that desired in the final product.

BACKGROUND OF THE INVENTION

The present invention relates to an improved method for the production of a very long seamless tubular wire having a metallic sheath or jacket and filled with a compressed powdery or pulverulent material, the tubular wire possessing an external diameter and wall thickness of desired predetermined dimensions.

The concept of providing a very long, tubular-shaped wire filled with a compacted powdery material is already known in the art. Manufacturing of such materials becomes more difficult as the required diameter of the wire is decreased and as the required length of the wire is increased. Prior art techniques have been especially developed for the production of welding rods or wires. Consequently, the present invention will be explained by way of example in connection with the production of a welding rod or wire. However, it is to be understood that the instant inventive concepts are not to be considered as limited to the production of this illustrative and preferred embodiment.

According to one prior art technique for producing materials of this kind, a sheet metal band is formed into a U-shaped trough in a first working operation. This trough is filled in a second working operation with a suitable powdery material and in at least a further working operation the edges of the aforementioned U-shaped trough are flexed or bent together along their edges until there is mutual contact in order to form a sheath or jacket for the powdery material. The tubular-shaped filled wire or rod which is produced in this manner can then be drawn through one or a number of drawing nozzles whereby, with practically constant wall thickness of the jacket, the cross-section of the wire is reduced and the powdery material located therein is compacted or compressed.

Rods or wires which have been manufactured according to this technique possess a number of different disadvantages. The primary difficulties are practically always attributable to the faulty connection of the edges of the jacket or sheath. More precisely, the flexed-together edges tend to open during every deformation or forming of the wire, even during rolling of the same upon a spool of relatively small diameter. Consequently, at least a portion of the powdery material is lost and the previously determined ratio of the sheath material to the filling material, a relationship of particular importance in the use of welding wire or the like as will be explained in further detail hereinafter, is destroyed. Furthermore, a flexed together or bent sheath provides insufficient protection for the enclosed material against moisture and contact with the surrounding atmosphere. This is particularly disadvantageous if the filling material is hygroscopic or, for instance, easily oxidizable. Furthermore, with such a construction, it is not possible to carry out any wet surface treatment of the tubular wire, and stress annealing after drawing of the wire can only be carried out while observing strict measures and with great technical expenditure.

It is for these reasons that it has already been attempted to overcome these disadvantages by employing a folded connection of the edges of the tubular sheath followed by a drawing of the folded tubular wire. However, this technique can only be employed for relatively thin sheet metal bands. Furthermore, practical experience has shown that even a folded connection does not provide sufficient safeguard against the splitting of the wire and such connection is neither airtight nor moisture resistant. Additionally, an extremely complicated manufacturing apparatus is necessary for the folding operation.

SUMMARY OF THE INVENTION

Accordingly, it is a primary object of the present invention to overcome the aforementioned drawbacks.

More specifically, it is an important object of the instant invention to provide a technique for forming elongated seamless tubular wire, such as welding wire or the like, wherein the ratio of wall cross-section to filling material volume can be varied to any desired value. Further, the instant invention provides techniques for the manufacture of such products which are sufficiently strong that they may be deformed to a significant degree without rupturing the sheath or jacket.

Another important object of this invention is the provision of elongated tubular wire which has a circumferentially continuous outer sheath or jacket protecting the powdery filling material against environmental moisture and permitting the wire to be subjected to a wet surface treatment such as electrochemical deposition of a surface coating. In this regard, utilizing the instant inventive concepts, it is also possible to stress anneal the tube after it has been filled, and between drawing operations, without detrimentally affecting the powdery material therewithin.

Now, in order to implement these and still further objects of the invention which will become more readily apparent as the description proceeds, the inventive method is characterized by the features that a seamless tube is wound upon a spool or core so as to be locked against movement. The spool with the wound tube thereon is filled with a predetermined quantity of powdery material through an open end of the tube while simultaneously jarring or shaking the spool. The powdery material is compressed due to the jarring motion to the density of the compacted volume. The filled tube is then drawn through at least one drawing nozzle in order to further compress the powdery material while simultaneously reducing the external diameter of the tube with practically constant wall thickness. Further drawing of the filled tube produces a proportional reduction of the wall thickness and external diameter of the sheath while utilizing the compressive strength of the filling material which has previously been obtained by the compacting or compressing operation.

In this manner it is possible to uniformly fill the tube with the powdery material. Furthermore, it is possible to thus-manufacture a tubular wire with uniform wall thickness and any optional or desired ratio between the cross-section area or volume of the wall and the enclosed filling or powdery material.

The completely enclosed surface renders possible storage times of the finished tubular wires which are of optional duration without having to undertake special measures, even when utilizing a hygroscopic filling powder. Further, such a construction permits the performance of a wet surface treatment, for instance the application of a corrosion-resistant surface layer or a good electrically conducting metallic surface layer. Additionally, it is possible to anneal the tubular wire between individual drawing operations so as to be free of stress, without having to employ special apparatus for this purpose. Finally, it is mentioned that tubular wires which are manufactured according to this technique can be strongly deformed or worked without the tubular jacket tearing or rupturing.

One of the most important advantages of the new and improved method is the possibility of manufacturing tubular wires with any desired or optional relationship of the wall-thickness of the jacket or sheath to the diameter, which naturally was not possible with the described previously known enclosed or sheathed wires.

The term "seamless" as used herein and in the appended claims shall be understood to refer to a circumferentially continuous jacket or sheath as distinguished from the flexed or abutting relationship of some prior art constructions of the type described hereinabove and the folded-edge arrangements of other prior art constructions of the type described hereinabove. On the other hand, this term shall be understood to include a jacket or sheath extruded or otherwise formed as a continuous tube as well as jackets or sheats in which the longitudinal edges have been welded together to form a continuous tube.

BRIEF DESCRIPTION OF THE DRAWING

The invention will be better understood, and objects other than those set forth above, will become apparent, when consideration is given to the following detailed description relating to the inventive method which will be explained by way of example as applicable to the production of a welding rod or wire. Such description makes reference to the annexed drawing wherein.

DESCRIPTION OF THE PREFERRED EMBODIMENTS

Figure 1:
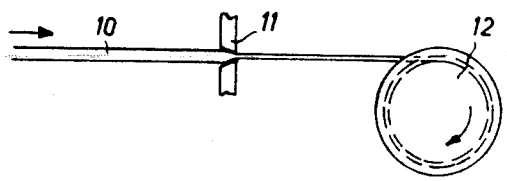
FIG. 1 schematically illustrates an initial drawing operation of a seamless wire or tube in conjunction with winding the same on a spool or reel for further processing.

Describing now the invention in greater detail, it should be understood that filled welding wires or rods which are suitable for electric arc welding embody a jacket or sheath which generally consists of conventional iron and a filling of a welding powder. This filling can possess varying compositions. For instance, such material can contain various deoxidation agents and alloying agents, slag forming agents and also iron filler. The external diameter of the conventional welding wires or rods is generally in the range of between about 0.5–4 millimeters. When producing a welding wire it is to be observed that the quality of a weld, among other things, is determined by the ratio of iron to welding powder. If a certain density is fixed for the welding powder, this ratio can be obtained by appropriate selection of the ratio of the volume of the cross-section of the iron sheath or jacket to the powder filling. Furthermore, it is to be observed that the wall thickness of a welding wire or rod should be as thin as possible in order to obtain a greater fusing or melting efficiency.

Now, in order to take into account the first-mentioned standpoint, it is possible to work in accordance with two different methods. It is possible to fabricate welding wires which exhibit different wall thicknesses of the iron sheath and always the same composition of the powdery filling material for different external diameters. However, it is also possible to manufacture welding wires with different external diameters and with practically uniform wall thickness of the iron sheath, and whose powdery filling exhibits a varying or different composition in order to maintain an optimum ratio of iron to welding powder. This can be achieved, for instance, in welding wires with relatively large external diameter and small wall thickness by the addition of iron powder to the powdery or pulverulent filling.

It has been discovered that the inner diameter of the tube is reduced, that is to say, there initially occurs a compaction or compression of the powdery material during drawing of a wire filled with a powdery material through a drawing nozzle. Thus, the reduction of the external diameter of the wire during drawing initially occurs with practically constant wall thickness. As soon as there has been achieved a certain compaction or compression of the filling material, the external diameter of the tube is reduced practically proportional to the wall thickness with further drawing at approximately constant density of the powdery material. Now, if the initial volume reduction of the filling material which is brought about by the drawing operation is experimentally determined for a certain powdery material, it is possible to derive a formula from which there can be obtained the initial desired relationship or ratio of the external diameter to the wall thickness of the starting tube. Then it is sufficient to draw any commercially available tube to this calculated initial ratio or relationship, and to fill this pre-drawn tube with the powdery material until reaching the compacted density following which the filling tube is further drawn until reaching the desired final diameter. With a known length of the pre-drawn tube and a known compacted or bulk volume of the powdery material which is to be filled, it is also possible to determine in advance the quantity of the powdery material to be fed into the pre-drawn tube.

For example, in order to produce a filled welding rod or wire in accordance with the inventive method there may be employed as the starting material a welded iron tube of 12 millimeters diameter and having a wall thickness of 1.8 millimeters. Tubes of this type are commercially available in lengths up to 500 meters. Initially a piece of at least about 30 meters, preferably about 50 meters may be cut from such a tube and the inside thereof may be mechanically cleaned to remove welding residues by propelling steel scrap through the tube by means of compressed air or an equivalent pressurized medium. Thereafter the tube may be washed with trichloroethylene or other suitable degreasing solvent in order to remove possibly fatty- and oil-residues. Finally, the tube may be checked for tightness by utilizing compressed air at 100 atmospheres absolute pressure. Tubes which are not tight will split or burst if they, together with the powdery filling, are drawn through the drawing nozzles. The thus-prepared tube may then be annealed in order to relieve the longitudinal welding seam from stress.

With reference now to the drawing, and more particularly to FIG. 1, after the aforementioned preparation or pre-treatments, the external diameter of the iron tube 10 is reduced with practically constant wall thickness in a first drawing nozzle 11 to such an extent that the ratio of the external diameter to the wall thickness corresponds to the calculated initial ratio or relationship. For a further understanding of this desired ratio or relationship between the external diameter and wall thickness of the tube and thus, the desired ratio or relationship between the material of the tube and the filling material, reference may be made to copending application Ser. No. 684,157, entitled "Filled Welding Rod," filed on an even date herewith in the names of the same inventors. The disclosure of this application is incorporated herein in its entirety by reference.

For this initial drawing operation, one end of the tube 10 is secured to a drum 12 and during winding up this rotating, driven drum, such tube is drawn by means of the drawing nozzle 11 arranged in front of the aforesaid drum. The force which is to be applied for drawing through the drawing nozzle 11, at the same time winds the tube 10 on the drum 12 so that it is locked against movement.

Figure 2:
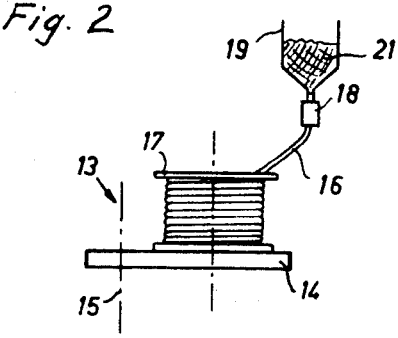
FIG. 2 schematically illustrates filling of wire or tube with a powdery or pulverant filling material while initially compacting the filling material by jarring or shaking the spool as the filling material is fed.

The drum 12, together with the wound tube 10, is then placed upon a jarring or shaking table 13 in a manner that the axis of the drum extends substantially vertically as shown in FIG. 2. This jarring table 13 incorporates a horizontal plate member 14 which is shaken about a vertical axis 15 by any conventional means. A free end 16 of the wound tube 10 is upwardly flexed past the upper drum edge or rim 17 and is operatively connected through a flexible hose 18 with a container 19. A pulverulent or powdery filling material 21 is located in this container 19. The quantity and composition of the filling material 21 may be previously determined in accordance with the above explanation. As mentioned hereinabove, the powdery material may contain deoxidation agents and alloying agents, slag forming agents and iron fillers. These components are sieved to a grain size of about 0.3 millimeters and dosed and subsequently mixed dry. Preferably, the grain size of the powdery material is not greater than the wall thickness of the final tube.

If the individual components of the powder mixture exhibit markedly different densities, then it is advantageous to agglomerate such to larger particles with the addition of a binding agent such as, for example, water glass. The binding agent is subsequently dried in a furnace and the agglomerated particles are again sieved, whereby the particle size is not greater than 0.7 millimeter. In this instance, the particle or grain size of the agglomerated material is preferably not greater than twice the wall thickness of the final tube.

After determination of the stamping or compacted weight of the thus-prepared filling powder, it is then posisible to easily calculate the required quantity of filling powder necessary for the production of a welding rod or wire from the dimensions assumed for the desired product and the dimensions of the iron tube which has been predrawn as described above.

Jarring of the wire 10 wound upon the drum 12 is continued for a length of time until the total calculated quantity of filling powder has been jarred or shaken into the tube. For example, approximately three hours are required for shaking 50 kilograms of filling powder into a tube having an internal diameter of 7 millimeters. The density of the filling powder in the tube then corresponds to the compacted or stamping density of the powder.

Figure 3:
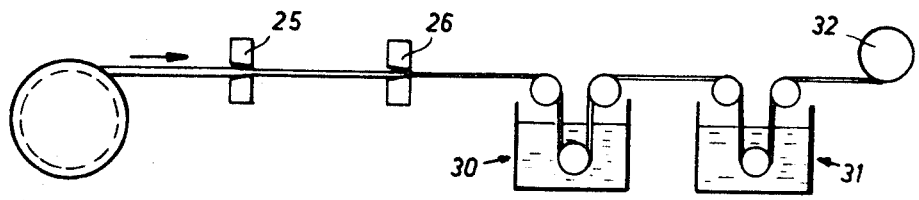
FIG. 3 schematically illustrates further drawing operations of the filled tube followed by cleaning of the external surface thereof and electrolytically depositing a protective coating on the filled tube.

The tube filled with the powdery material is subsequently drawn in a known manner through a number of drawing nozzles 25, 26 as shown in FIG. 3 in order to draw its external diameter and its wall thickness down to the desired final values. In order to relieve the stress of the deformed metal the filled tube may be intermediately annealed, for which purpose the tube which has been wound upon thed rum after one drawing operation may be placed together with the drum in an annealing furnace.

After the last drawing operation the welding wire which already possesses its final dimensions may be guided through a chemical cleaning bath 30 in order to remove the remainder of the oxidation occurring during annealing and also to remove the lubricating agent which was employed during drawing from the surface. The cleaned welding wire or rod may then be galvanically copper plated in a further bath 31 and finally wound onto a roller 32, from which, at a later time, the desired quantity can be removed.

It is to be understood that the working operations of the described method can be modified or amplified in a number of different ways. For instance, in order to improve the slip-free winding of the pre-drawn empty tube upon the drum it is possible to further provide a brake between the drawing nozzle and the drum, which brake then increases the pretension of the tube which is to be wound. It is also possible to improve the slip-free or non-movable connection of the tube with the drum by means of displaceable side walls of the drum, whereby these displaceable side walls, after the empty tube is wound upon the drum, are pressed together in any conventional manner. Furthermore, it is not necessary, in order to intermediately anneal the wound tube together with its drum, to bring such into an annealing furnace. Rather, the intermediate annealing operation can take place by conducting the tubular wire through a furnace arranged between two drawing nozzles.

It should be apparent from the foregoing detailed description that the objects set forth at the outset of this specification have been successfully achieved. Accordingly,

What is claimed is:

1. A method for the production of an elongated seamless filled tubular welding wire including a metallic jacket filled with a compressed powdery material, wherein the tubular wire possesses a predetermined external diameter and wall thickness, comprising the steps of winding a seamless tube having a length of at least 30 meters onto a spool, filling the wound tube with a predetermined quantity of powdery material through an open end of said tube while simultaneously jarring the same to compact the powdery material to a predetermined density, drawing the filled tube in order to further compress said powdery material while simultaneously reducing the external diameter of said tube without significantly modifying the wall thickness thereof, and further drawing said filled tube to further reduce said external diameter of said tube while utilizing the compressive strength of said powdery material previously obtained by compacting the same to preclude reduction of the internal diameter of said tube thereby reducing said wall thickness of said tube in proportion to said reduction of said external diameter.

2. The method defined in claim 1 further including the step of mechanically and chemically cleaning the interior of said tube prior to filling the same.

3. The method defined in claim 1 further including the steps of testing said tube for tightness and stress annealing the same prior to filling the same.

4. The method defined in claim 1 further including the step of pre-drawing said tube prior to filling to provide the same with a ratio of wall cross-section to interior volume similar to the ratio of wall cross-section to filling material volume in the finished tubular wire.

5. The method defined in claim 1 wherein the powder grains of said powdery material are at least as small as the thickness of the wall of the finished tubular wire.

6. The method defined in claim 1 further including, when employing mixtures of powders of different density, in order to prevent separation, the step of agglomerating the powders with binding agents into particles which are at least as small as twice the thickness of the wall of the finished tubular wire.

7. The method defined in claim 1 wherein the compression of said powdery material in said tube is carried out with simultaneous reduction of the external diameter of said tube without significantly modifying the wall thickness thereof and wherein the reduction of the wall thickness of said tube is carried out in different drawing nozzles while utilizing the compressive strength of said powdery material previously obtained by compacting the same.

8. The method defined in claim 1 further including the step of annealing said tube between individual drawing operations so as to relieve stress therein.

9. The method defined in claim 1 further including subjecting drawn, filled, tubular wire to a surface treatment.

10. The method defined in claim 11 wherein said surface treatment is electrochemical.

11. A method for the production of an elongated filled seamless tubular welding wire which includes a metallic jacket filled with a compressed powdery material, wherein the tubular wire possesses a predetermined external diameter and wall thickness comprising the steps of winding a seamless tube having a length of at least 30 meters onto a spool, wherein said spool with the tube wound thereon is disposed so that the winding axis is vertically oriented, filling the wound tube with a predetermined quantity of powdery material through an open end of said tube while simultaneously jarring the same in a plane of movement which is disposed transverse to said winding axis in order to compact the powdery material to a predetermined density, drawing the filled tube through at least one drawing nozzle in order to further compress said powdery material while simultaneously reducing the external diameter of said tube without significantly modifying the wall thickness thereof, and further drawing said filled tube to further reduce said external diameter of said tube while utilizing the compressive strength of said powdery material previously obtained by compacting the same to preclude reduction of the internal diameter of said tube thereby reducing said wall thickness of said tube in proportion to said reduction of said external diameter.

References Cited

UNITED STATES PATENTS

| | | | |
|---|---|---|---|
| 1,501,266 | 7/1924 | Brace | 219—146 |
| 2,700,091 | 1/1955 | Culbertson et al. | 219—146 |
| 2,888,740 | 6/1959 | Danis | 29—420.5 X |
| 3,245,140 | 4/1966 | Markert et al. | 29—420 |
| 3,365,565 | 1/1968 | Claussen | 219—146 |
| 3,404,200 | 10/1968 | Burgess | 29—420.5 X |
| 3,429,025 | 2/1969 | Baily et al. | 29—420 |

JOHN F. CAMPBELL, Primary Examiner

D. C. REILEY, Assistant Examiner

U.S. Cl. X.R.

219—146